May 9, 1961        L. DEVOL        2,983,900

NEW SONO-OPTICAL VIEWING SYSTEM

Filed April 19, 1955

INVENTOR
LEE DEVOL

BY

ATTORNEYS

2,983,900
NEW SONO-OPTICAL VIEWING SYSTEM

Lee Devol, Dayton, Ohio, assignor to the United States of America as represented by the Secretary of the Navy Filed Apr. 19, 1955, Ser. No. 502,534

7 Claims. (Cl. 340—3)

(Granted under Title 35, U.S. Code (1952), sec. 266)

The invention described herein may be manufactured and used by or for the Government of the United States of America for governmental purposes without the payment of any royalties thereon or therefor.

This invention relates to a sono-optical viewing system. More particularly the invention provides a system applying optical interference principles to sound detection of underwater objects. In this application, the term sound is used to refer to all frequencies of vibration having the same characteristics of transmission as audible sound. From a study of wave motions it is well known that waves reflected from surfaces at different distances from the source of radiation will have a difference in phase between the reflected waves if the distances from the surfaces to the source differ by other than a whole number of wave lengths of the wave motion. These phase differences can be employed in some instances to produce beat frequencies such as are well known in acoustics. In the field of light such phase differences may be employed to produce such phenomena as Newton's rings and interferometer patterns.

If the two plates of the Newton's ring device are perfectly symmetrical then the rings produced by a monochromatic light are perfectly concentric. However, if there is present an irregularity in either of the adjacent surfaces of the device, the rings are distorted at the point of the irregularity.

In the device of the present invention the phase differences in a reflected sound wave are detected and presented as an interference pattern on a display screen such as a cathode ray television tube. This display will show lines, produced as a result of interference of the reflected wave motions, all points on each line having the same phase shift. These interference lines will be distorted by the presence of discontinuities in the reflecting surface. These interference lines will have spacing determined by the wave length of the wave motion and the resulting display will resemble a contour lined map of the area from which reflections of the wave motion are received. The present invention uses a high frequency sound carrier wave mixed with a second frequency selected to provide a desired spacing of the interference lines. These frequencies are selected to provide good transmission through the medium while their beat frequency provides good readability in the interference pattern display. These properties of this invention lend themselves to the detection of objects in the area from which the reflected waves are received.

In previous object detection systems the object was located by means of a range difference between the object and the surrounding area. This ranging was a function of the time displacement between the transmitted and received signals.

Such systems display the position of an object as an azimuth and range with reference to a reference point on the display tube. A display of this kind gives only a two dimensional representation of the position of the object and leaves identification of the objective very difficult.

It is an object of the present invention to provide a system for detecting and locating underwater objects.

Another object of this invention is to provide an object locating system capable of presenting in two dimensions a three dimensional representation of the area searched.

Another object of this invention is to provide a system for displaying the image of an area as a series of contour lines.

A further object of the present invention is to provide a system employing a beat frequency to establish the contour lines in the display.

Other objects and many of the attendant advantages of this invention will be readily appreciated as the same becomes better understood by reference to the following detailed description when considered in connection with the accompanying drawings wherein.

Figure 1:
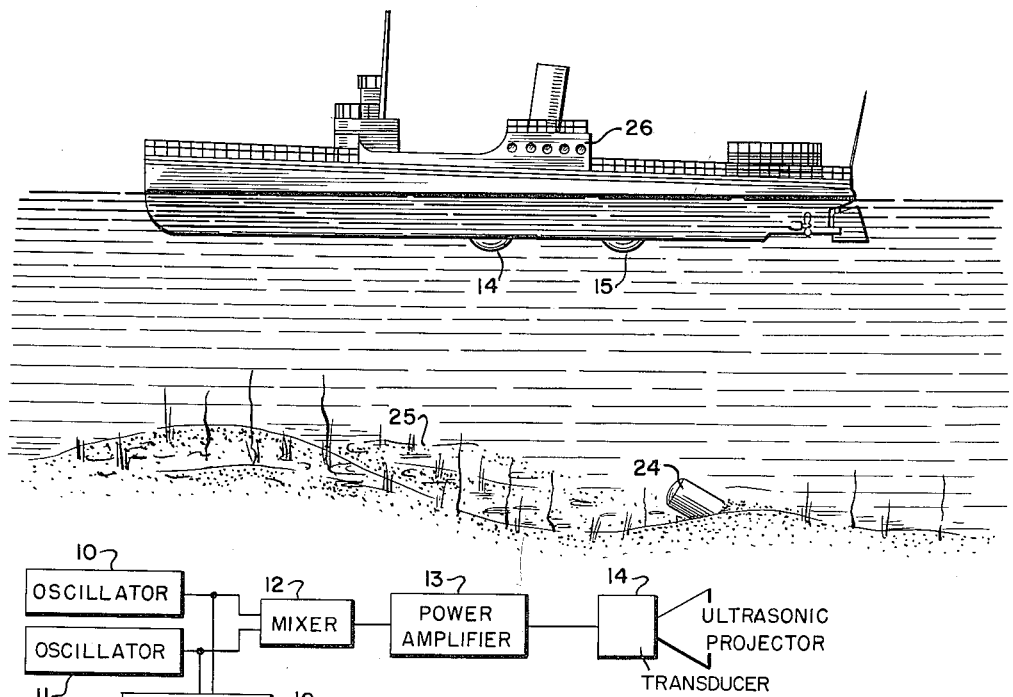
Fig. 1 is a pictorial view showing a use of the present invention.

Referring to Fig. 1, it is desired to locate an object such as a practice torpedo 24 which has become lost and is shown partially buried in the mud bottom of a body of water. The apparatus of the present invention would be carried by a carrier such for example as a vessel 26 with a transducer 14 for propagating the wave motion into the medium being carried affixed to or mounted in the submerged portion of the vessel 26 and directed downwardly, preferably near the center bottom of the vessel. A receiving means 15 would also be mounted in a similar manner on the vessel 26 or the receiving means might be mounted in a submerged position on a nearby float or might be suspended on a cable. The signals propagated from 14 strike the bottom 25 and object 24 and are reflected back to receiver 15.

The receiving means 15 may be, for example, of the type comparable to the tube employed in a television camera and differs in that it is adapted to receive sonic waves rather than light waves. More specifically the tube might be of the type disclosed in Patent No. 2,164,125 to S. Sokoloff in Fig. 4. The reflected sound waves would be received by a plurality of discrete transducers whose electrical output could be scanned in synchronization with the sweep of the display tube 23 shown in the block diagram Fig. 2.

Figure 2:
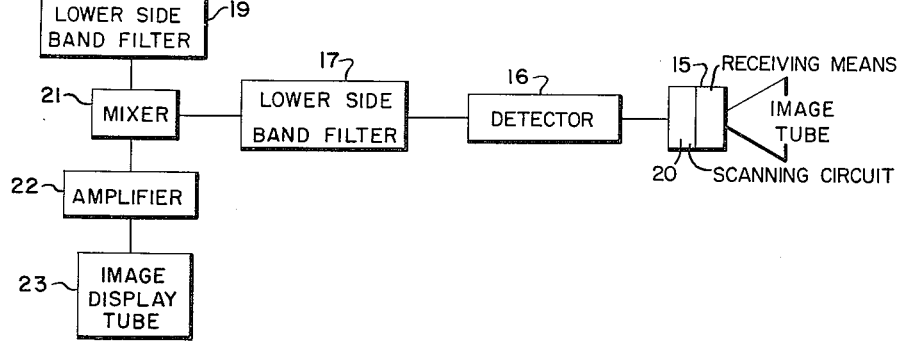
Fig. 2 is a block diagram of the system of the present invention.

Referring now to Fig. 2 for a description of the system, 10 and 11 are oscillators of conventional design, each producing an oscillating signal of a frequency different from the other. These two signals are fed into a mixer 12 where the two signals are combined and fed into the power amplifier 13 from which the mixed signals comprising the two are fed to a transducer 14 for projection into the sonic transmitting medium. For example, the oscillators 10 and 11 may be constructed to oscillate at 100,000 and 101,000 cycles per second respectively.

The mixed signal components are reflected back from the surface being searched. These reflected components will differ in phase by an amount depending upon how much the distance from the source to the point of reflection differs from a whole number of wave lengths. These reflected and phase shifted signals are received by the receiving means 15. In the receiving means the signals are scanned and passed through a detector 16 where the beat frequency is detected. The detected signal is then passed through a band pass filter to eliminate all frequencies except the beat frequency. This beat frequency is then combined with a beat frequency signal obtained by passing the output of oscillators 10 and 11 through the detector 18 to produce a beat frequency and passing the modulated signal through a band pass filter to eliminate all but the beat frequency. This beat frequency is in phase with the beat frequency transmitted through transducer 14 and is combined with the reflected beat frequency in mixer 21 to produce an interference signal. The interference signal is amplified by amplifier 22 and presented on a display tube 23, which may be of a television picture tube type.

The oscillators, mixers, detectors, amplifiers, image display tube and circuit and filters are of conventional circuit design, as is also the transducer 14. The transducer receiver 15 would consist of a plurality of transducers arranged in an array to be scanned by a scanning circuit 20 either electrically or mechanically. In operation the beat frequency is chosen so that its wave length is somewhat shorter than the dimensions of the object to be detected. The wave length of this beat frequency determines the contour interval in the display since the interference pattern produced on the display tube will have alternate bright and dark lines, each line composed of points corresponding to points on the reflecting surface that are equidistant from the receiver.

It will be noted that the general shape of the interference lines is determined by the distance the receiver is located from the reflecting surface while the number of lines per inch across the pattern is a function of the wave length of the beat frequency. The lines received from a flat surface at a great distance will be displayed substantially as a series of straight lines while those received from a nearby flat surface will be presented as a series of curved lines with the closeness of the lines being determined by the wave length of the beat frequency.

It should be understood that the receiver could be mounted on other means than directly on a ship, e.g. it might be mounted to be lowered on a cable to receive a closer view of the reflecting surface.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A sono-optical device having means for projecting a sound wave into a sound transmitting medium and means for receiving a reflection of said projected wave, circuit means connected between said projecting and said receiving means for producing interference signals in said circuit means depending upon the phase difference of the reflected and the projected waves and means for visually indicating the pattern of the interference signals.

2. A device as claimed in claim 1 in which the means for projecting a sound wave includes two oscillators producing different frequencies, means for combining the output of said oscillators to produce a beat frequency, signal means in said circuit for limiting the frequency range of the signal transmitted thereby, and means in said receiver for limiting the received signal to the same frequency range as the first limited frequency range.

3. A device as claimed in claim 2 in which said receiver includes a scanning machine.

4. A sono-optical device having means for producing two signals having different frequencies, means for combining said signals to produce a beat frequency, means for projecting all components of said combined signals as sound waves in a fluid sound transmitting medium, means for receiving reflections of said sound waves from objects in said medium, means connected to the means for producing two signals and to the receiving means for combining the beat frequency component of the projected and received signals to produce an interference pattern of said objects and visual means for displaying said pattern.

5. A device as claimed in claim 4 in which said means for producing two signals comprises two oscillators.

6. A device as claimed in claim 4 in which said means connected to the means for producing two signals and said means for receiving has in each of its connecting circuits a low frequency band pass filter.

7. A device as claimed in claim 4 in which said visual means is a cathode ray tube.

References Cited in the file of this patent

UNITED STATES PATENTS

| | | |
|---|---|---|
| 2,453,502 | Dimmick | Nov. 9, 1948 |
| 2,528,725 | Rines | Nov. 7, 1950 |
| 2,623,931 | Bagno | Dec. 30, 1952 |